Patented May 8, 1934

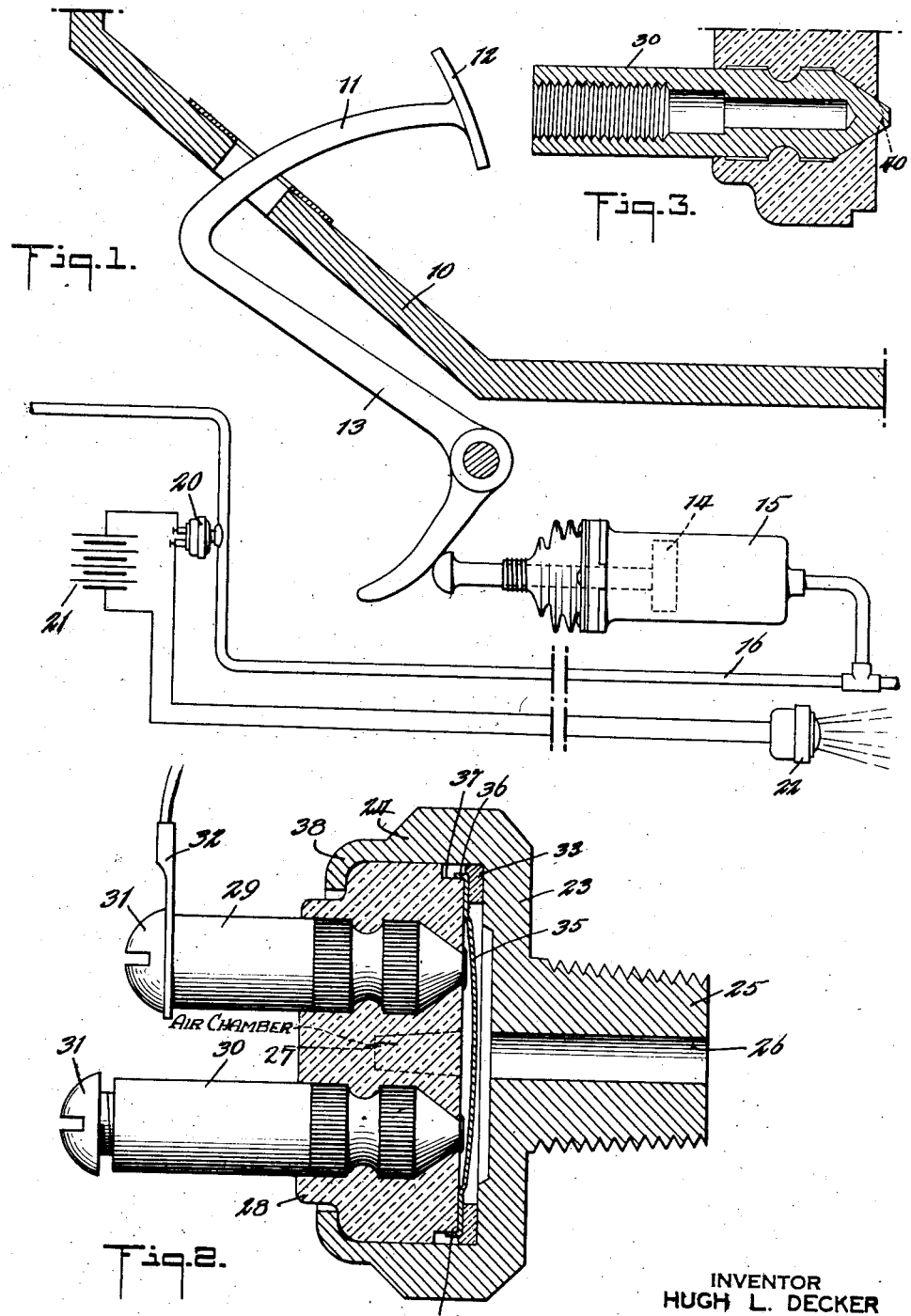

1,958,297

UNITED STATES PATENT OFFICE 1,958,297

FLUID OPERATED SWITCH

Hugh L. Decker, Toledo, Ohio, assignor to Moto Meter Gauge & Equipment Corporation, Toledo, Ohio, a corporation of Delaware Application January 28, 1932, Serial No. 589,485

8 Claims. (Cl. 200—83)

This invention relates to fluid operated switches, and more particularly to switches of this character adapted for installation in fluid pressure brake systems for motor vehicles, for completing a circuit to a stop light when the brakes are applied.

Objects of the invention are to simplify and improve the construction and operation of switches of this character, to render them inexpensive to manufacture, convenient to install, not likely to get out of order, and otherwise well adapted for the purpose set forth.

Other objects and features of novelty will be apparent as the following description proceeds, reference being had to the accompanying drawing, in which Figure 1 is a diagrammatic view, partly in section through an automobile floor board, showing the braking system to which the fluid operated switch according to the present invention is applied;

Figure 2 is an enlarged detail section through the fluid operated switch according to the present embodiment of the invention; and Figure 3 is a similar section through a part of the molded insert, showing the method of construction.

In Figure 1 there is shown the floor board 10 of an automobile, through which projects the stem 11 of a brake pedal 12 which serves to operate a brake lever 13. The lever 13 operates the piston 14 of a fluid pressure cylinder 15 which is connected to a fluid pressure brake system indicated generally at 16. The system 16 includes brake shoe operating cylinders (not shown) by means of which the brakes of the vehicle are applied, when pressure is built up in the cylinder 15 by operation of the brake pedal 12.

A fluid pressure operated switch 20 is connected to the brake system 16 and is adapted, when pressure is applied, to complete an electric circuit including the switch 20, a battery or other source of current 21, and an alarm 22 which is preferably the well known stop light mounted at the rear of the vehicle.

The construction and operation described above is known in the art, and forms no part of the present invention, which is directed to the construction of the switch 20.

In Figure 2 the fluid pressure responsive switch is shown as comprising a cup-like casing having a base portion 23 and an annular flange or wall portion 24. A central boss 25 is provided for the base portion 23 and is threaded for connection into the fluid pressure brake system 16 at any convenient point. A passage 26 is formed in the boss 25 so that the pressure of the system 16 may be applied to the interior of the casing as will hereinafter appear.

The casing is provided with an insert 28 which is preferably of molded material such as a phenol condensation product. This insert includes a pair of spaced contacts 29 and 30, which are embedded in the plastic material of which the insert is constructed. The contacts 29 and 30 are preferably knurled and grooved as shown, in order to afford a secure bond with the plastic material in which they are embedded. These contacts are also drilled and tapped as shown in Figure 3, to receive screws 31 (Fig. 2) and thus afford convenient connection for terminals 32 for the electric wiring.

The contacts 29 and 30 are preferably formed with conical ends as shown by the solid lines in Figure 3, prior to being embedded in the plastic material. During the molding operation, due to the high pressure prevailing in the presses, the points of the contacts are flattened somewhat as shown by the dotted line in Figure 3. After the molding operation is completed, the points are smoothed off until they project about .003 of an inch above the surface of the bakelite. This is shown in rather exaggerated form in Figure 2.

An air chamber is formed in the insert 28, preferably during the molding operation. As shown in dotted lines in Figure 2, this air chamber comprises holes 27, tapered to facilitate the molding process, which extend into the insert from the inner surface thereof through which the contact points project.

In assembly, the insert is constructed with the contacts embedded therein as described. An annular compressible member, such as a rubber gasket 33 is inserted within the annular wall 24 and abuts against the base portion 23. A thin flexible metal diaphragm 35 is interposed between the compressible member 33 and the insert 28. This diaphragm is dished so as to be normally concave toward the contacts 29 and 30. The outer edge of the diaphragm 35 is provided with a flange 36 which fits over the shoulder formed by an annular groove 37 formed in the insert 28.

When the parts are assembled as described, the rim 38 of the annular wall 24 is crimped or rolled inwardly to permanently retain the insert 28 in a position to bear against the rim of the diaphragm 35 and retain the member 33 under compression so as to afford a sealing joint. This compression causes the rubber gasket 33 to spread up and around the flange 36 of the diaphragm and assists in insulating the diaphragm from the outside shell.

It will be noted as shown in Figure 2, that in the normal position of the dished diaphragm 35, the same is clear of engagement with the contacts 29 and 39. However, when pressure is applied to the braking system 16 the pressure is transmitted through the passage 26 to the interior of the switch and this pressure is thus imposed upon the convex side of the diaphragm. The pressure thus imposed forces the diaphragm into engagement with the contacts 29 and 30, so that there is metal to metal engagement of the diaphragm with both contacts, thus insuring the passage of current therebetween. When the braking pressure is released, the resiliency of the diaphragm 35 returns the same to the position shown in Figure 2.

The air holes 27 are of advantage in insuring smooth operation of the device. In absence of this provision, an extremely heavy pressure due to an excessive application of the brakes, might flatten the diaphragm 35 to the extent that the entire surface would contact with the bakelite insert. This condition would force out the air therebetween, which, under this high pressure, might escape between the flange 36 and the insert 28 and thence between the insert and the wall portion 24 of the casing. Due to such escape of the air, the return of the diaphragm would tend to create a vacuum which would oppose the return of the diaphragm, and render the diaphragm at least sluggish in action.

The air chamber formed by the holes 27 prevents the formation of this vacuum effect. Instead, the air is forced into the holes and there compressed, but not to an excessive pressure, and this pressure facilitates the return of diaphragm to normal position.

The gasket 33 also contributes to the satisfactory operation of the device. The pressure resulting from applying the brakes, which is imposed upon the convex side of the diaphragm, is also imposed upon the gasket 33. As this pressure increases, the compression of the gasket increases and effects a better seal.

If for any reason the device requires adjustment because the diaphragm does not engage the contacts, such adjustment may be made in a very simple manner. Each contact member 29 and 30 has a bore such as shown in Figure 3. A tool such as a punch is inserted in this bore and is given a slight hammer blow. The flat point of the contact, as shown in Figure 2, is caused to bulge outwardly, thus increasing the distance which the contact surface projects above the bakelite surface. The point of the contact takes a form similar to the dotted line 40 in Figure 3. This brings the contact surface nearer to the diaphragm, and insures engagement of the diaphragm with the contact when the diaphragm is under braking pressure.

I claim:

1. In a fluid operated switch, in combination an insulating member having a plane surface with an annular margin, a pair of spaced contacts embedded in said insulating member and exposed through said surface, a dished metal diaphragm concave toward said contacts and having an annular margin, means for maintaining said annular margins clamped together, means for applying fluid pressure to the convex side of said diaphragm to flatten the same into engagement with said insulating member plane surface and the contacts exposed therethrough, and means for passing an electric current from one of said contacts through said diaphragm to the other of said contacts.

2. A fluid operated switch comprising in combination, a cup-like metal casing having a base portion and an annular wall portion integral therewith, said base portion having a recess formed therein, said casing having a passage communicating with said recess, an insert for said casing comprising a molded block of insulating material with a pair of spaced contacts embedded therein, said insert having a smooth surface with said contacts exposed therethrough, a dished metal diaphragm having its margin clamped between the margins of said insert and said base portion, with the convex side of said diaphragm toward said recess, whereby fluid pressure applied to said recess through said passage flattens said diaphragm into engagement with said contacts exposed through said surface, and whereby excess pressure flattens said diaphragm into supporting engagement with said surface, which prevents said diaphragm from reversing its curvature.

3. In a fluid operated switch, in combination a metallic cup-like casing, having a cylindrical side wall, an insert for said casing comprising an insulating member having a contact member having an end exposed through the surface of said insulating member and substantially flush therewith, said insulating member having an annular recess forming a shoulder, a dished metal diaphragm concave toward said surface and having an annular flange overlying said shoulder, and an annular compressible member between said diaphragm and said casing, the rim of said cylindrical side wall being crimped over said insert to compress said annular member and cause it to flow into said annular recess and retain said annular flange against said shoulder and insulate said flange from said metallic casing.

4. In a fluid operated switch, in combination, an insulating member, a contact member embedded in said insulating member and having an end exposed through the surface of said insulating member and substantially flush therewith, said contact member having a bore extending close to the exposed surface of said end, whereby said end may be deformed to project beyond said surface by a tool inserted in said bore.

5. In a fluid operated switch, in combination, a cup-like casing, an insert for said casing comprising an insulating member having a contact member embedded therein, said contact member having an end exposed through the surface of said insulating member and substantially flush therewith, said insulating member having an annular recess forming a shoulder, a dished metal diaphragm concave toward said surface and having an annular flange overlying said shoulder, and an annular compressible member between said diaphragm and said casing.

6. A fluid operated switch comprising, in combination, a cup-like casing including an annular wall portion and a base portion having a passage therethrough, an insert for said casing comprising a block of insulating material carrying a contact, a dished metal diaphragm between said insert and said base portion with the convex side of said diaphragm toward said passage, an annular compressible member between said diaphragm and said base portion, and means for maintaining said insert in said casing in position to maintain said annular member under compression.

7. In a fluid operated switch, in combination, a contact, a dished metal diaphragm concave toward said contact, means for applying fluid pressure to the convex side of said diaphragm to flatten the same into engagement with said contacts, and means for building up back pressure when said diaphragm is flattened, for assisting the return thereof to concave position when said applied pressure is released.

8. In a fluid operated switch, in combination, a molded insert having a plane surface, contacts embedded therein and exposed through said surface, a dished metal diaphragm concave toward said exposed contact and having a margin engaging said surface, and means for applying fluid pressure to the convex side of said diaphragm to flatten the same into engagement with said contacts, said surface preventing said diaphragm from reversing its curvature.

HUGH L. DECKER.